Feb. 10, 1970

G. RAFFAELLI 3,494,184

METHOD AND APPARATUS FOR MEASURING THE PRESSURE OF HOT TIRES

Filed March 21, 1967

INVENTOR

GIULIO RAFFAELLI

BY

ATTORNEYS

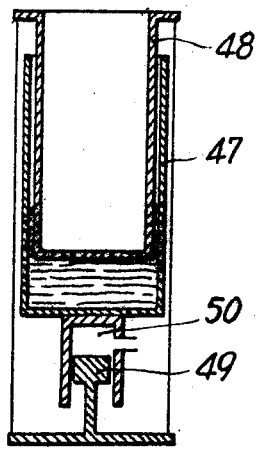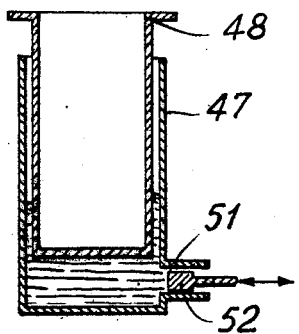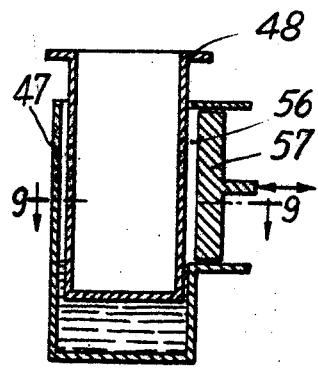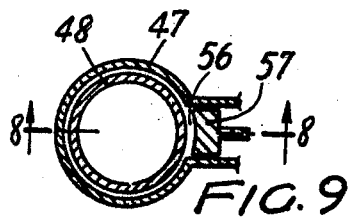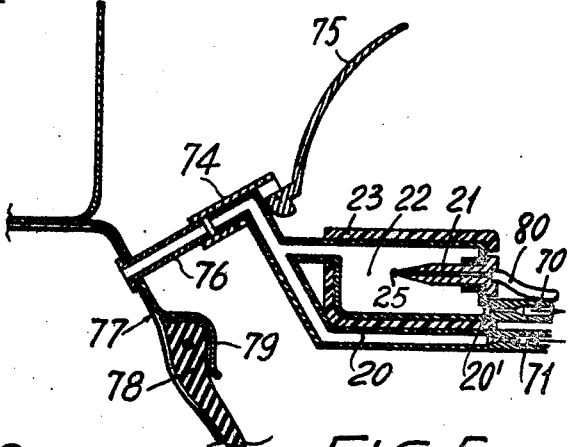

United States Patent Office 3,494,184
Patented Feb. 10, 1970

3,494,184
METHOD AND APPARATUS FOR MEASURING
THE PRESSURE OF HOT TIRES
Giulio Raffaelli, Via del Duomo 12, Lucca, Italy
Filed Mar. 21, 1967, Ser. No. 624,805
Claims priority, application Italy, Mar. 26, 1966,
16,027/66; June 3, 1966, 18,647/66; Oct. 12, 1966,
41,252/66; Jan. 19, 1967, 32,902/67
Int. Cl. B60c 19/10
U.S. Cl. 73—146.3                                7 Claims

ABSTRACT OF THE DISCLOSURE

A pressure gauge in communication with the air in a tire includes a graduated scale movable relative to a fixed scale. The graduated scale is operatively connected to a motor which is controlled by a circuit having two thermistors responsive to the temperatures of the air in the tire and the ambient air, respectively.

This invention relates to a method of and means for measuring the pressure of air in tires corrected to the ambient air temperature. The devices embodying the method of this invention will indicate the pressure a tire would have when cold, that is at the same temperature as ambient air, instead of indicating the actual pressure being sensed. Tire pressure indicators presently used are usually resilient element or mercury or hydrostatic operating gauges, providing the actual pressure measurement of air within the tire. However, air pressure in a tire substantially increases in relation to temperature increase occurring therein owing to rolling deformation friction. Accordingly, if the air pressure in a tire is corrected according to the schedule supplied by the manufacturer after the vehicle has been operated a certain distance, this pressure will be improper. This is because the schedule supplied by the manufacturer is based on ambient air temperature while the temperature of the air in the tire is greater than the ambient air temperature. The result is that the reading taken is false and that the pressure of the air in the tire will be lower than that indicated by the manufacturer's schedule when corrected to the temperature of the air in the tire. As a consequence, overheating and rapid wearing of the tire will result, with possible blowout and reduced adherence to the road.

The invention overcomes said drawbacks, since both the temperature of ambient air and the temperature of air within the tire are taken into account when the air pressure is indicated. The amount of the air pressure in the tire provided by the temperature increases is subtracted from the total pressure to give a corrected pressure reading corresponding to the ambient air temperature. The pressure being indicated is therefore always the same as the tire would have if at a cold or ambient air condition. More particularly, a pressure, equal to or lower than the actual pressure, will be indicated, the ratio of the former to the latter being the same as the ratio of absolute temperature of the ambient air to temperature of the air within the tire. Therefore it is not necessary to take into account the tire temperature of the air in the tire, as is required with present gauges.

In order to carry out the method of the present invention, a preferred gauge must be equipped with feelers or responsive means for sensing the temperatures, and with a measuring circuit which will compare the indication of the feelers and will provide an electrical quantity. Where thermistors are used in the feelers, a bridge circuit will be adopted to give an output proportional to the ratio of temperatures being examined. This output will be used to power a servomechanism to balance the bridge circuit and adjust the gauge to read tire pressure corrected to the ambient air temperature. Where thermocouples are used in the feelers the correction will be less accurate because of the sensitivity of thermocouples but acceptable owing to the limited variations of room temperature. Since the amount of correction has obviously to be proportional to the actual pressure, besides being a function of examined temperatures, it will be necessary to introduce into the preferred section of the circuit or amplifier a pressure responsive element converting said pressure value into an electrical quantity. It is to be noted that where the instrument scale is said additional element is not necessary. Such condition is attained with a good approximation in the hyperbolic scales of mercury columns provided a valve is used which will close the upper end of the tube wherein mercury ascends, and thus such an additional element may be advantageously omitted. Such an additional element may also be omitted when the same result is mechanically attained, as hereinafter stated.

Voltage provided by the measuring circuit is applied to any member (motor, solenoid, etc.) which will proportionally correct the instrument indication and is selected in relation to the system being adopted for providing said correction. Generally, the correction will be provided by causing the scale of the instrument to shift, and said member will be a motor causing said scale to shift through an appropriate driving mechanism. At the same time the motor will operate an element connected in the measuring circuit, the electrical quantity of which will vary proportionally to scale shift amount. According to operation principle of the device constructed on the basis of the present method, other substantially equivalent systems may be adopted for carrying out the correction.

One of the possible embodiments of the invention will now be described, reference being made to the appended drawings in which:

FIG. 5 is a cross-sectional view showing the connection of the invention to the tire;

FIG. 6 is a schematic diagram of a second embodiment of a pressure gauge of the invention;

FIG. 7 is a schematic diagram illustrating a first modification of the second embodiment of the invention;

FIG. 8 is a schematic diagram illustrating a second modification of the second embodiment of the invention; and, FIG. 9 is a cross-sectional view taken along line 9—9 in FIG. 8.

Figure 1:
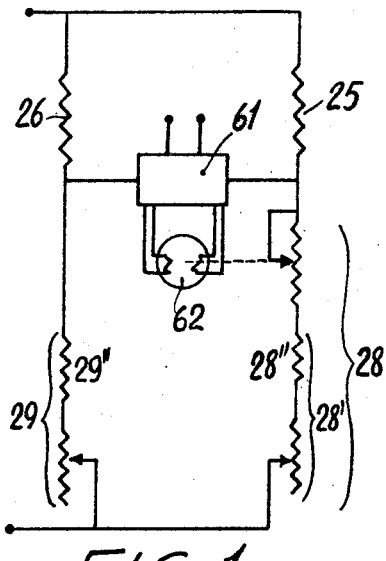
FIG. 1 is an electrical schematic diagram of one embodiment of the measuring circuit of the invention.

The circuit shown in FIGURE 1 is of the "bridge" type and is essentially formed of thermistors or feelers 25 and 26, by which the temperature of the air within the tire and the temperature of the ambient air are respectively sensed, of rheostat 28, the value of which varies in conjunction with the stroke of the instrument scale, and of rheostat 29, which may act both as a calibration resistance and as the aforesaid additional element in order that the correction be proportional to the value of the pressure being sensed. For a more accurate measurement it may be preferable to reverse the functions of the thermistors or feelers 25 and 26. The portion 28' of rheostat 28 should be the same value as that of element 29 so that these two elements can be equally and simultaneously varied in accordance to the pressure being sensed. This insures that the corrections made are proportional not to the pressure indicated by usual gauges, which is a pressure differential between absolute and atmospheric pressures, but to absolute pressure. That portion 29" of element 29 remains unchanged when the element is used to effect a correction proportional to pressure. Due to the above noted requirements for equality between values of the portion 28' and the element 29, a portion 28" of that portion 28' similar to the portion of 29 should remain unchanged.

The voltage being sensed in a diagonal of the bridge circuit is applied to an amplifier 61 which supplies current to one of two windings of a suitable double-wound servo-adjusting motor 62 to cause the motor 62 to appropriately rotate and move the adjusting portion of rheostat 28 to balance the bridge circuit and stop the motor 62.

Figure 2:
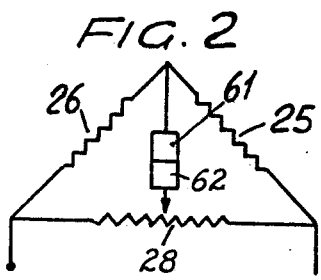
FIG. 2 is an electrical schematic diagram of another embodiment of the measuring circuit of the invention.

When connection in the circuit of the element rendering the correction proportional to the pressure is not required, the above disclosed circuit may be somewhat simplified as shown in FIG. 2. This does, however, result in a loss of accuracy since correction is not linear with the above specified variables. In this circuit, a rheostat 63 is connected between the two feelers, or thermistors 25 and 26. The amplifier 61 and motor 62 are connected in the circuit to manipulate the rheostat 28 and balance the circuit while at the same time causing a shifting of the gauge scale to correct for temperature.

Where thermocouples are employed, the voltage being supplied will have to be amplified by varying the amplification factor in accordance with the electrical quantity provided by an element, such as that previously described, in order to fit the correction to be made to the pressure value. A correction which is proportional to the voltage provided by the circuit may then be used to adjust the gauge.

The devices by which the present measuring method can be carried into effect are the usual gauges, which are equipped with the above shown circuit and additional elements.

Figure 3:
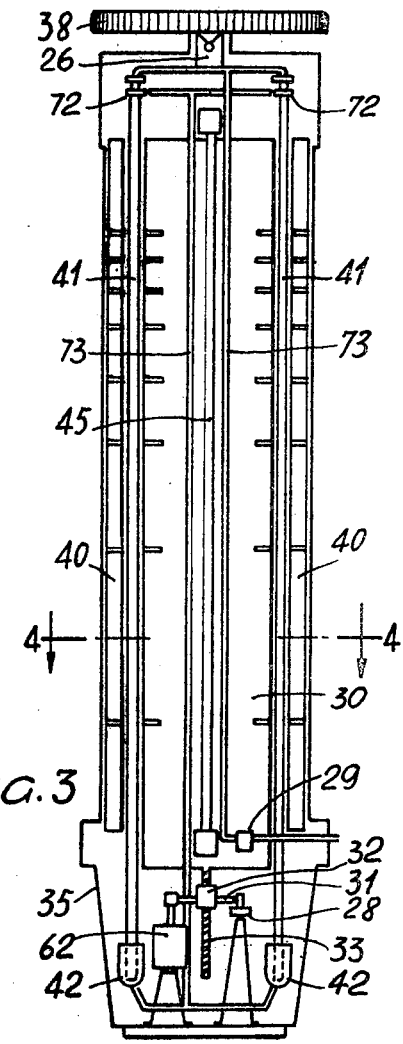
FIG. 3 is a cross-sectional view of one embodiment of the pressure gauge of the invention.
Figure 4:
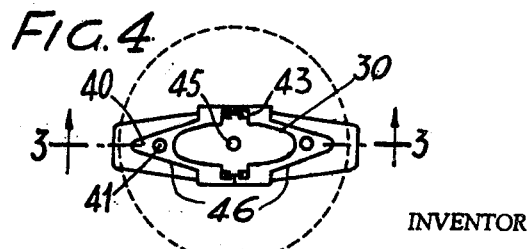
FIG. 4 is a cross-sectional view taken along line 4—4 in FIG. 3.

Application of the present measuring method to a mercury operating gauge is shown in FIGS. 3 and 4. This gauge is essentially formed of a supporting structure 35, a pair of tubes 41 within which the mercury ascends which communicates with mercury containing bulbs 42 at their lower ends on valves 72 at the top of said tubes. An inlet tube 73 is provided for placing the air being sensed from the tire in communication with the bulbs 42 to force mercury up the tubes 41. A movable graduated scale 30 equipped with lamp 45 is positioned adjacent to tubes 41. To carry into effect the present measuring method, scale 30 is made movable by causing it to shift on guides 43 secured to the supporting structure of the pressure measuring instrument or pressure gauge. Said scale is shifted by rotation of motor 62 through preferred gears, such as reduction gears 31 integral with female thread 32 within which worm 33 runs, said worm being secured to the scale. Motor rotation will simultaneously operate rheostat 28 to balance the correction circuit and cause the motor 62 to stop. For safety reasons, the measuring instrument may be also provided with fixed scales 40; the whole being then enclosed by the transparent casing 46. The measuring instrument should also be equipped with the feeler or thermistor 26 for sensing the temperature of ambient air, preferably located at an airy location and protected from heat radiation from the sun. For this purpose, the measuring instrument may be overlapped by an insulating cap 38. When necessary, element 29 is inserted in tube 73 and acts as previously described according to whether the instrument scale is linear or not.

Where the gauge by which the present measurement method is desired to be carried into effect is of the circular scale type, rotation of motor will generate an appropriate rotation of the scale, instead of a shift as is described above.

For measuring the temperature of the air drawn from the tire, it is necessary to insert the feeler or thermistor 25 in the tube 73, as near as possible to the valve 76, in the tire 78 as shown in FIG. 5 in order to prevent the pressure measurement from being performed effected when the temperature is reduced. A possible embodiment for the housing of said feeler 25 is shown in FIG. 5, said housing being essentially formed of a chamber 22 closed by thermo-insulated walls 23 communicating with the inner tube 77 in tire 78 through a conventional cap 74 having a lever 75 connected to the valve 76 of inner tube 77 carried in the tire rim 79. Feeler 25 is connected to the electric measuring circuit as seen in FIGS. 1 or 2 by a suitable conductor 80. It is desirable that only air drawn from the tire will be allowed to pass into the chamber, and not the air supplied by a conventional air distribution system (not shown) for tire inflating. For this purpose, two tubes 20 and 20' are interposed between cap 74 and the deliver gun of the distribution system, respectively for air inlet into the tire and for air drawing. The same object may be attained by placing valves 71 and 70 respectively in said tubes, which valves will allow air passage only in the direction shown by the arrows, so that the tube may be a single one from the valves to the deliver gun.

Another type of gauge, to which the present measurement method may be applied, is the hydrostatically operated gauge essentially formed as shown in FIG. 6. It includes a transparent container 47, in which a liquid is contained, the level of said liquid providing an indication of the pressure by comparison with a graduated scale applied on said container 47. A floating body 48 is positioned in the container 47 and has a piston 49 fixed thereto and slidable within a suitable cylinder 50 fixed to container 47 and communicating with the tire. Thus, any increase of pressure within the cylinder 50 will cause a sliding of the piston 49 and floating body 48 until a new balance position is attained with an appropriate rising of the liquid level. The correction of pressure indication may be performed in this embodiment of the gauge by having a separate scale (not shown) which shifts outside container 47 in response to the temperature variance between the air in the tire and ambient air. This correction for temperature may also be made by varying the amount of liquid within the container 47 that is by taking off and supplying the desired amount of liquid to the container 47, such as shown in FIG. 7. This may be accomplished through cylinder 51 communicating with the container 47 and having a piston 52 therein. The capacity of the cylinder 51 varies in accordance with the position taken by piston 52 moved by operation of a servomotor through preferred gears. The pressure correction for temperature may also be made for the second embodiment of the gauge by varying the cross-section of container 47 from zero of the scale, taking into account the above-mentioned difference between the absolute and atmospheric pressures, so that the liquid level in the container is reduced by an amount proportional to cross-section increase. Said section variation may be achieved by several solutions, one of which is shown in FIGS. 8 and 9. This solution is performed by making an approximately rectangular shaped aperture 56 in a side of the container 47 and positioning a piston 57 therein, the position of which is responsive to operation of a servomotor such as motor 62 connected to the correction circuit. Other solutions may be those of applying a bellows on a side of the container, the shifting of the end wall of the container 47 to cause container cross-section to be varied; or vertically inserting in the container 47 some tubes of a resilient material, the cross-section of which may be varied with a resulting variation of the remaining cross-section of the container, or through injection and extraction from said tubes in the container of a liquid supplied by a cylinder in communication with the tubes and having a piston therein moved by operation of a servomotor such as motor 62. This second system for making the correction for temperature by varying the container cross-section, provides the advantage of not requiring the circuit insertion of the element 29 producing the indication correction to the pressure being sensed. This is the cause the scale of the instrument is a linear scale, since correction increase takes place automatically as liquid level raises.

It is to be noted that compressed air supplied by the distributing system may be used for shifting the movable means or pistons adopted in the above described gauges in order to correct the indication with the stroke adjustment effected by adjusting the aperture of suitable inlet and outlet valves of the cylinder according to known methods.

A useful expedient tending to avoid correction inaccuracy is to render the measuring instrument responsive only to the temperature being sensed during the first pressure measurement, so that, in the event of subsequent pressure adjustments, the correction will not be affected by the cold air between the tire and feeler. This may be obtained by connecting in the electric circuit a relay or other preferred switch cutting off the current from the circuit when balance position is attained, while for re-operating the instrument a further normally closed switch may be parallel connected to the former and which will be opened and maintained open by a pressure responsive element inserted in the tube leading the air from tire to the measuring instrument.

What is claimed is:

1. Apparatus for measuring the air pressure in a tire comprising:
   pressure gauge means having an indicator means in communication with the air in the tire and scale means movably carried adjacent the indicator means; and,
   shifting means responsive to the temperature of the air in the tire and the temperature of the ambient air for shifting said scale means with respect to said indicator means to correct the pressure reading of said indicator means to the temperature of the ambient air.

2. The apparatus as set forth in claim 1 wherein said shifting means includes circuit control means having an output responsive to the difference in the temperatures of the air in the tire and the ambient air, and servo means operatively connected to said scale means and said circuit control means, said servo means moving said scale means in response to said output to correct the pressure reading of indicator means to the temperature of the ambient air.

3. The apparatus as set forth in claim 2 wherein said circuit control means further includes a bridge type circuit having a first temperature sensing means in one leg thereof in communication with the air in the tire, a second temperature sensing means in another leg thereof in communication with the ambient air, and adjusting means connecting said first and second means and operatively connected to said servo means for activating said servo means in response to the output of said sensing means to balance said bridge type circuit.

4. The apparatus as set forth in claim 3 wherein said adjusting means includes an amplifier connecting said sensing means and said servo means to activate said servo means, and a rheostat connected to said servo means and connecting said sensing means, said servo means adjusting said rheostat when activated by said amplifier to balance said circuit.

5. The apparatus as set forth in claim 4 wherein said first and second temperature sensing means are thermistors.

6. The apparatus as set forth in claim 4 wherein said first and second temperature sensing means are thermocouples.

7. A method of measuring pressure in a pneumatic tire comprising the steps of:
   sensing the temperature of the air within said tire,
   sensing the temperature of the air outside said tire,
   sensing the pressure of the air within said tire, and
   correlating said sensed pressure at said temperature within said tire by servo-mechanical means to indicate what the pressure within said tire would be if the temperature within said tire were substantially equal to the sensed temperature outside said tire.

References Cited

UNITED STATES PATENTS

| 2,679,759 | 6/1954 | Gilmont | 73—393 |
| 2,693,113 | 11/1954 | Hejouk | 73—393 |
| 2,722,641 | 11/1955 | Cross | 73—393 XR |
| 3,236,102 | 2/1966 | Whatham et al. | 73—393 XR |

FOREIGN PATENTS 88,291  2/1921  Switzerland.

DONALD O. WOODIEL, Primary Examiner

U.S. Cl. X.R.

73—393, 401